US008810166B2

(12) United States Patent
Nagao et al.

(10) Patent No.: US 8,810,166 B2

(45) Date of Patent: Aug. 19, 2014

(54) OPENING AND CLOSING DEVICE, ELECTRONIC APPARATUS, AND IMAGE FORMING APPARATUS

(71) Applicant: Sharp Kabushiki Kaisha, Osaka (JP)

(72) Inventors: Hiroyuki Nagao, Osaka (JP); Kazuhisa Yoneda, Osaka (JP); Shinichiroh Hiraoka, Osaka (JP); Yasushi Nakamura, Osaka (JP); Hidenobu Mandai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 16 days.

(21) Appl. No.: 13/650,250

(22) Filed: Oct. 12, 2012

(65) Prior Publication Data

US 2013/0091774 A1 Apr. 18, 2013

(30) Foreign Application Priority Data

Oct. 17, 2011 (JP) ................................ 2011-227689

(51) Int. Cl.
*H02P 1/00* (2006.01)
*H02P 3/00* (2006.01)
*H02P 3/20* (2006.01)

(52) U.S. Cl.
USPC ........................... 318/266; 318/466; 318/626

(58) Field of Classification Search
USPC ......................................... 318/266, 626, 466
See application file for complete search history.

(56) References Cited

U.S. PATENT DOCUMENTS

| | | | | |
|---|---|---|---|---|
| 3,957,173 A * | 5/1976 | Roudebush | ..................... | 221/15 |
| 4,251,009 A * | 2/1981 | McLaughlin et al. | .......... | 221/12 |
| 4,949,651 A * | 8/1990 | Frank et al. | .................. | 109/24.1 |
| 7,044,331 B2 * | 5/2006 | Lee | .............................. | 221/191 |
| 7,071,644 B2 * | 7/2006 | Kawanobe | .................... | 318/280 |
| 2009/0045198 A1 * | 2/2009 | Kao et al. | ...................... | 220/260 |

FOREIGN PATENT DOCUMENTS

| | | |
|---|---|---|
| JP | 02-143484 U | 12/1990 |
| JP | 06-077671 A | 3/1994 |
| JP | 07-237655 A | 9/1995 |
| JP | 2001-301791 A | 10/2001 |
| JP | 2005-074981 A | 3/2005 |

* cited by examiner

*Primary Examiner* — Erick Glass
(74) *Attorney, Agent, or Firm* — Renner, Otto, Boisselle & Sklar

(57) ABSTRACT

An opening and closing device includes a cover gear, a driving source, a cover, a biasing element, and a control portion. The cover gear is rotatably supported in both forward and backward directions. The driving source selectively provides rotation to the cover gear in both the forward and backward directions. The cover is rotatably supported to allow motion in both the forward and backward directions between first and second positions. The biasing element transmits the rotation of the cover gear to the cover while biasing the cover in a predetermined direction from the first position to the second position. The control portion stops the rotation of the driving source, in a case in which the driving source is rotated to move the cover in the predetermined direction, when the cover gear rotates in the predetermined direction by a predetermined angle after the cover has reached the second position.

7 Claims, 9 Drawing Sheets

OPENING AND CLOSING DEVICE, ELECTRONIC APPARATUS, AND IMAGE FORMING APPARATUS

CROSS REFERENCE

This Nonprovisional application claims priority under 35 U.S.C. §119(a) on Patent Application No. 2011-227689 filed in Japan on Oct. 17, 2011, the entire contents of which are hereby incorporated by reference.

BACKGROUND OF THE INVENTION

The present invention relates to an opening and closing device that automatically opens and closes an opening and closing cover by rotation of a motor, and also relates to an electronic apparatus and an image forming apparatus that are equipped with such an opening and closing device.

Some electronic apparatuses such as an image forming apparatus read data from a recording medium, such as a memory card and an optical disc, which is inserted into an insertion opening by a user, and perform an image formation process, such as photo printing, using the read data. When the recording medium is pulled out from the insertion opening while data is being read, the data in the recording medium may be damaged. In attempt to overcome such a problem, an opening and closing device that opens and closes an insertion opening with a cover is used.

For example, Japanese Patent Laid-Open Publication No. 2005-74981 discloses an opening and closing device that swingably supports a cover, by a swinging shaft of a cover body, between a closed state in which the cover covers a memory slot and an open state in which a memory can be attached to and detached from the memory slot. When the cover is in a position close to the closed state, an elastic force of a twisted coil spring acts on the cover in a closing direction, and when the cover is in a position close to the open state, the elastic force of the twisted coil spring acts on the cover in an opening direction. The load of an oil damper acts on the swing of the cover. This configuration is believed to improve operability and use experience, by providing assistance in the manual operations of the cover by the user through the elastic force of the twisted coil spring, and by controlling the swing speed to an appropriate speed, and thus preventing the cover from becoming partially open.

Furthermore, in order to eliminate the need for the user to operate the cover, there is an opening and closing device provided with a motor that rotates in both a forward direction and a backward direction and a transmission mechanism in which the forward rotation and the backward rotation of the motor are selectively transmitted to the cover.

However, when the rotation stop position of the motor is changed due to errors such as a mounting error, the load that acts on the motor and the transmission mechanism becomes excessively large. In addition, the load of the motor also becomes large in a case in which the motor is excessively rotated in order to securely close the cover. These may cause a possibility of generation of abnormal noise from the motor and breakage of the motor and the transmission mechanism. Moreover, in a case in which a finger of the user is caught while the cover is being closed, the operation of the cover cannot be stopped.

In view of the foregoing, an object of the present invention is to provide an opening and closing device that can automatically open and close a cover without making a load of a motor and a transmission mechanism excessively large, and to provide an electronic apparatus and an image forming apparatus that are equipped with such an opening and closing device.

SUMMARY OF THE INVENTION

An opening and closing device of the present invention is provided with a cover gear, a driving source, a cover, a biasing element, and a control portion. The cover gear is rotatably supported in both a forward direction and a backward direction. The driving source selectively provides rotation to the cover gear in both the forward direction and the backward direction. The cover is rotatably supported to allow motion in both the forward direction and the backward direction between a first position and a second position. The biasing element transmits the rotation of the cover gear to the cover while biasing the cover in a predetermined direction from the first position to the second position. The control portion stops the rotation of the driving source, in a case in which the driving source is rotated so as to move the cover in the predetermined direction, when the cover gear rotates in the predetermined direction only by a predetermined angle after the cover has reached the second position.

The foregoing and other features and attendant advantages of the present invention will become more apparent from the reading of the following detailed description of the invention in conjunction with the accompanying drawings.

DETAILED DESCRIPTION OF THE INVENTION

Figure 1A:
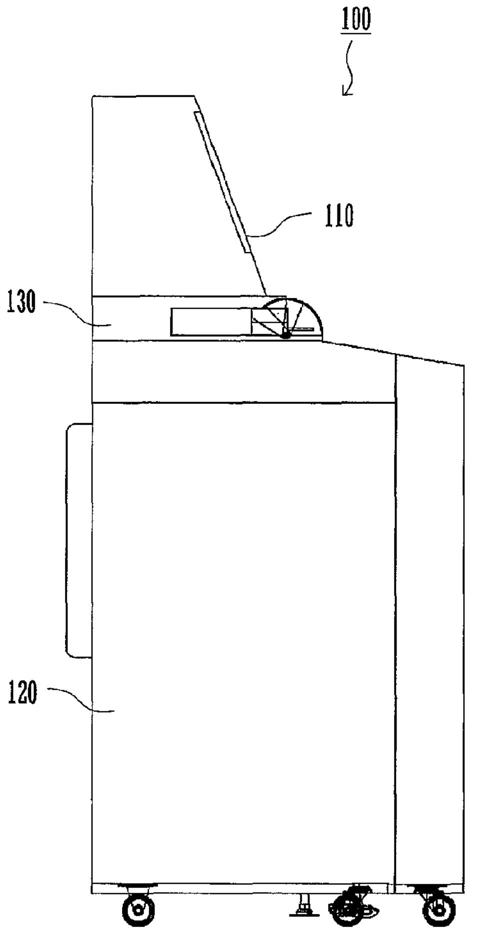
FIG. 1A is a side view of an image forming apparatus according to an embodiment of the present invention and FIG. 1B is a front view of the image forming apparatus according to the embodiment of the present invention.
Figure 1B:
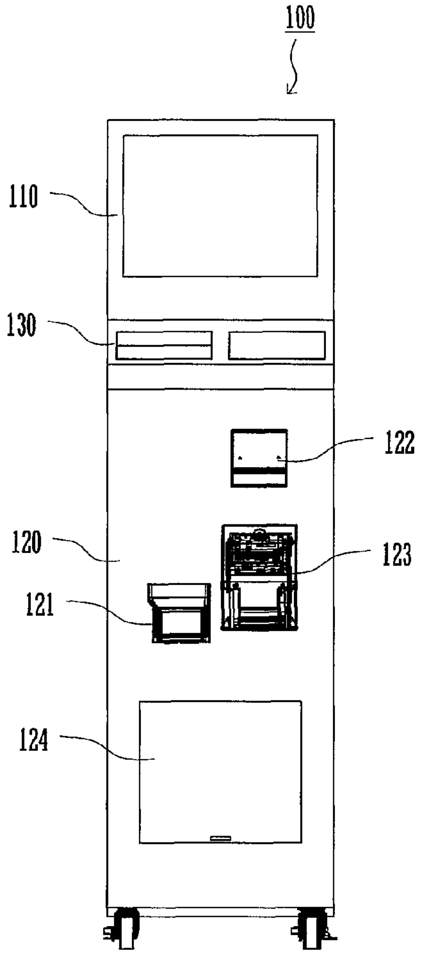

As shown in FIG. 1, an image forming apparatus 100 is provided with a monitor 110, a main body portion 120, and a data acquisition portion 130, and prints an image on a sheet for a photographic image as a recording element.

The monitor 110 is disposed on the upper part of the image forming apparatus 100. The monitor 110 has a touch panel and accepts various settings such as selection of data to be printed and a print start command.

The main body portion 120 is provided with a coin receiving port 121, a bill receiving port 122, a money ejection port 123, and an output port 124, and is disposed on the lower part of the image forming apparatus 100. The coin receiving port 121 receives a coin for payment, and the bill receiving port 122 receives a bill for payment. The money ejection port 123 ejects a change after settlement of the payment. The output port 124 outputs a photograph after printing.

Figure 2:
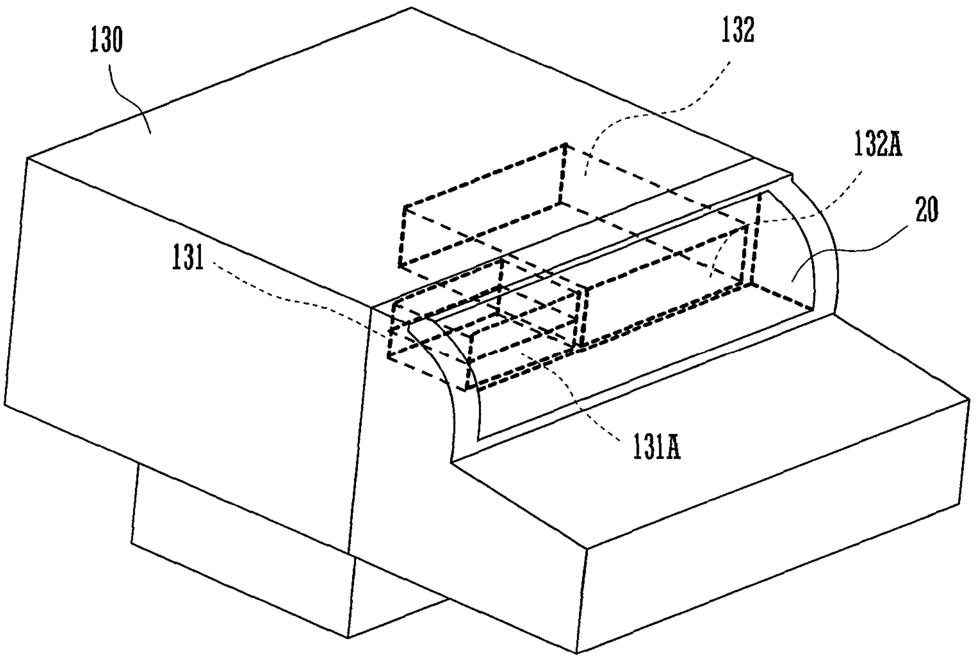
FIG. 2 is an external view of a data acquisition portion included in the image forming apparatus.

As shown in FIG. 2, the data acquisition portion 130 is provided with a memory slot 131, a disc drive 132, and an opening and closing device 30 (see FIG. 3) of a cover 20, and is disposed between the monitor 110 and the main body portion 120.

The memory slot 131 has an insertion opening 131A at the front, and accepts insertion of a memory card as a recording medium from the insertion opening 131A. The disc drive 132 has an insertion opening 132A at the front, and accepts insertion of an optical disc such as a compact disc and a DVD as a recording medium from the insertion opening 132A.

The cover 20 moves back and forth between a closed state and an open state in a circular arc following a shape of a concave curve that faces the insertion openings 131A and 132A. The cover 20 covers the insertion openings 131A and 132A in the closed state.

Figure 3A:
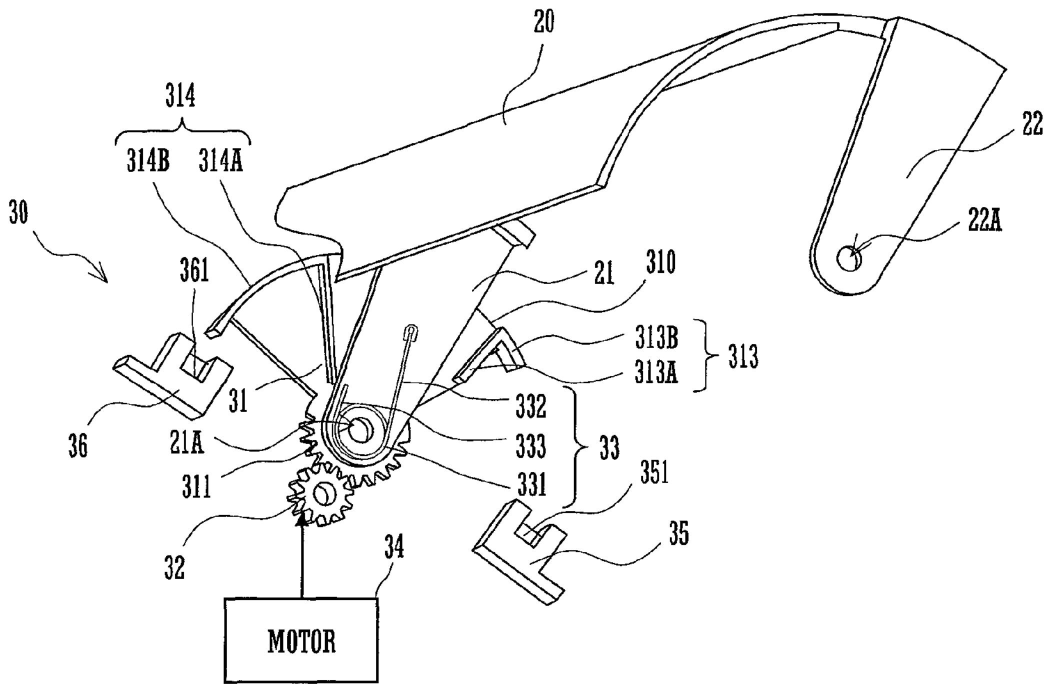
FIG. 3A is a perspective view from a cover side, showing a mechanism of an opening and closing device included in the data acquisition portion
Figure 3B:
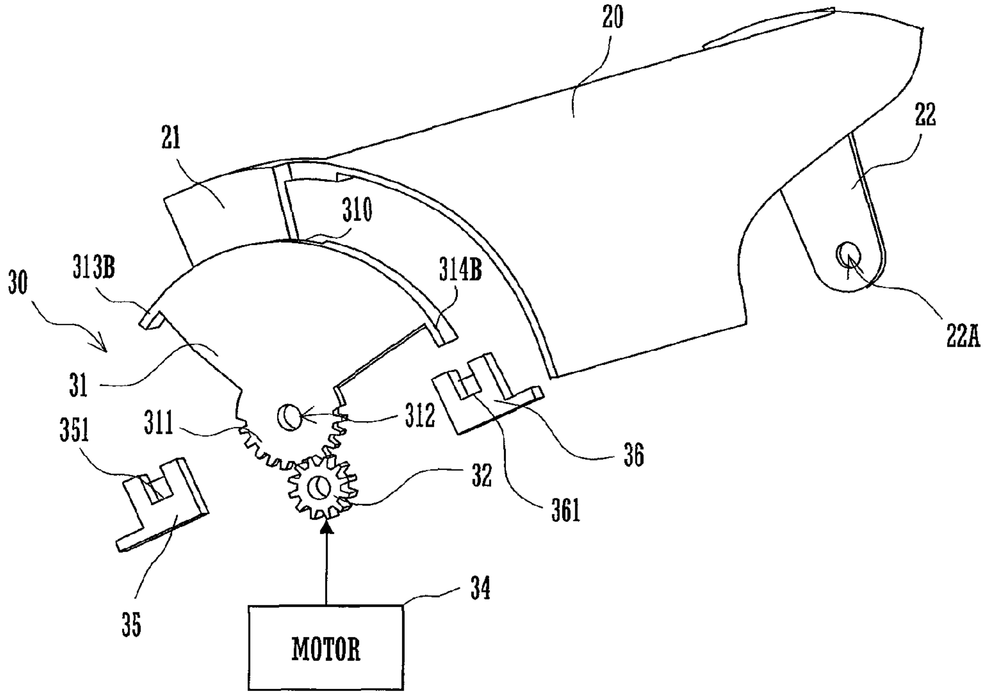
FIG. 3B is a perspective view from a cover gear side, showing the mechanism of the opening and closing device included in the data acquisition portion.

As shown in FIG. 3, the opening and closing device 30 is provided with the cover 20, a cover gear 31, a gear 32, a twisted coil spring (which is equivalent to a biasing element of the present invention) 33, a motor (which is equivalent to a driving source of the present invention) 34, and a pair of sensors (which are equivalent to a sensing portion of the present invention) 35 and 36. To begin with, a description will be made of each element that constitutes the opening and closing device 30.

The cover 20 is, as viewed from the side, in a shape of a circular arc of which an angle is obtuse. The cover 20, as viewed from the front, has a pair of support elements 21 and 22 that support the cover 20 and that are formed integrally on both ends of the cover 20. Each of the support elements 21 and 22, as viewed from the side, is formed on an end of the circular arc of the cover 20, and protrudes toward the concave side of the circular arc. The pair of support elements 21 and 22 has penetrating ports 21A and 22A that are formed on an open end side of the support elements 21 and 22, respectively.

The cover gear 31 is in the shape of a fan as viewed from the side, has a circular arc shaped gear 311 with a convex curved tip, and is formed on the leading edge side in which the two sides that form a circular arc 310 in between intersect. The circular arc shaped gear 311 forms an obtuse angle and has a penetrating port 312 that is formed in the center of the gear 311. The circular arc shaped gear 311 is linked to a gear 32 and is supplied with rotation of the motor 34 through the gear 32. The motor 34 is controlled by a control portion 105 (see FIG. 5).

The cover gear 31 includes a pair of restricting ribs 313 and 314 that restrict rotation of the support element 21. The restricting rib 313 is in the approximate shape of a letter L, and is provided with: a body portion 313A formed along one of the two sides holding the circular arc 310 in between; and a protruding portion 313B which protrudes on an extension of the circular arc 310 and toward the outside of the cover gear 31. The restricting rib 314 is in the approximate shape of a letter L, and is provided with: a body portion 314A in which a direction from the circular arc shaped gear 311 to the circular arc 310 is defined as a longitudinal direction; and a protruding portion 314B which is formed along the circular arc 310 and protrudes toward the outside of the cover gear 31. The body portion 313A and the body portion 314A are disposed so that one end of the support element 21 may contact the body portion 314A when the support element 21 is rotated only by a predetermined angle from a state in which the other end of the support element 21 contacts the body portion 313A.

The twisted coil spring 33 is provided with a coil portion 331 and arms 332 and 333, and receives twisting moment around the central axis of the coil portion 331. The arm 332 is formed longer than the arm 333.

The pair of sensors 35 and 36 is an optical sensor, and is provided with concave portions 351 and 361, respectively. The sensor 35 senses that the protruding portion 313B of the restricting rib 313 has reached the concave portion 351 and outputs the sensed result to the control portion 105 while the sensor 36 senses that the protruding portion 314B of the restricting rib 314 has reached the concave portion 361 and outputs the sensed result to the control portion 105.

Subsequently, a description will be made of how to assemble the opening and closing device 30. The cover 20 is disposed so that the pair of support elements 21 and 22 may be positioned on the back side of the cover 20. The cover gear 31 is disposed on the outside of the support element 21. The cover gear 31 is disposed so that the support element 21 may be held between the body portion 313A of the restricting rib 313 and the body portion 314A of the restricting rib 314. The restricting rib 314 is disposed at the front side while the restricting rib 313 is disposed at the back side.

The twisted coil spring 33 is stretched between the support element 21 and the cover gear 31. The penetrating ports 21A and 22A of the pair of support elements 21 and 22, and the coil portion 331 of the twisted coil spring 33, along with the penetrating port 312 of the cover gear 31, may be preferably penetrated coaxially by a rotating shaft, into the penetrating port 312, the coil portion 331, and the penetrating ports 21A and 22A in that order. It is to be noted that the pair of support elements 21 and 22 and the cover gear 31 may be penetrated by separate shafts on different axes. By penetrating the pair of support elements 21 and 22 and the cover gear 31 coaxially, rotation can be effectively transmitted from the cover gear 31 to the support element 21.

The arm 332 of the twisted coil spring 33 is mounted on the outer surface of the support element 21, whereas the arm 333 is mounted on the inner surface of the cover gear 31.

The pair of sensors 35 and 36 is disposed so that the sensor 35 senses the cover gear 31 when the cover 20 is open and the sensor 36 senses the cover gear 31 when the cover 20 is closed. The cover 20 is positioned in a first position of the present invention when the cover 20 is open and is positioned in a second position of the present invention when the cover 20 is closed.

Figure 4A:
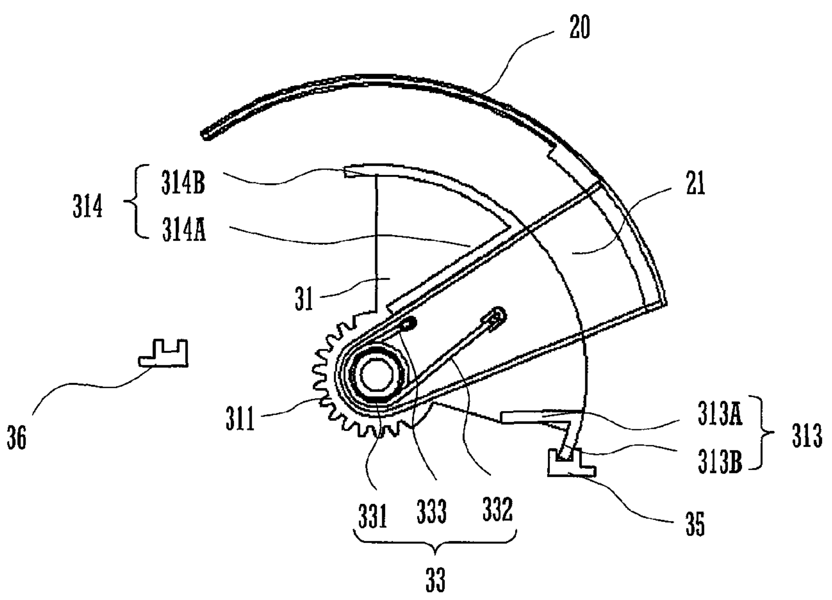
FIG. 4A is a side view in a state in which the cover is open.

The sensor 35 is positioned in an open position in which the protruding portion 313B of the restricting rib 313 reaches when the cover 20 is open (see FIG. 4A). The sensor 36 is positioned in a closed position (which is equivalent to the third position of the present invention) in which the protruding portion 314B of the restricting rib 314 reaches when the cover gear 31 rotates only by a predetermined angle (see FIG. 4C) from a state in which the cover 20 is closed (see FIG. 4B). In the state in which the cover 20 is closed, the protruding portion 314B of the restricting rib 314 reaches a relaying position.

Figure 5:
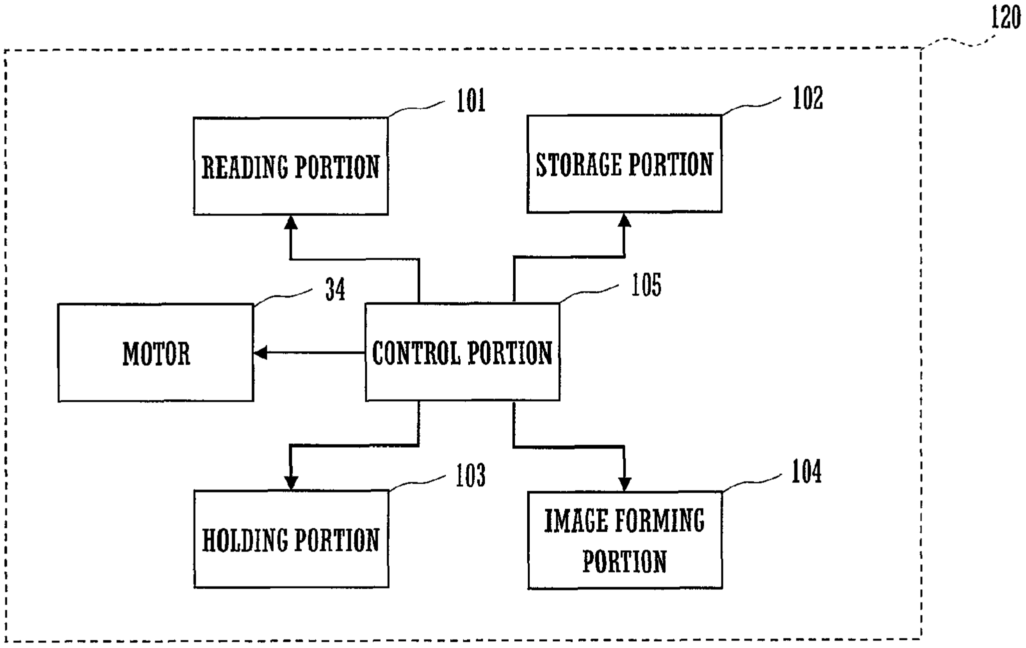
FIG. 5 is a block diagram showing a part of a functional portion of the image forming apparatus.

As shown in FIG. 5, the image forming apparatus 100 further includes a reading portion 101, a storage portion 102, a holding portion 103, an image forming portion 104, and the control portion 105 and the like in the main body portion 120.

The reading portion 101 reads data from a memory card and an optical disc. The storage portion 102 temporarily stores the data read by the reading portion. The holding portion 103 holds a sheet for a photographic image waiting to be processed for image formation. It should be noted that the holding portion 103 may hold not only the sheet for a photographic image but also a plain sheet waiting to be processed for image formation.

The image forming portion 104 performs an image formation process by various known methods such as a sublimation type thermal transfer method and an inkjet printing method on a sheet for a photographic image, which is held in the holding portion 103, by using the data temporarily stored in the storage portion 102. By the sublimation type thermal transfer method, ink is sublimated by heating an ink ribbon to which solid ink of cyan, magenta, and yellow is applied by using a print head, and the ink is made to adhere to the sheet for a photographic image, coated with a polyester resin. By the inkjet method, magenta ink, cyan ink, yellow ink, and black ink are pressurized and discharged from a printer nozzle, the discharge direction of the discharged ink is changed by a deflecting electrode plate, and the ink is sprayed on the sheet for a photographic image.

The control portion 105 controls each functional portion.

Figure 6:
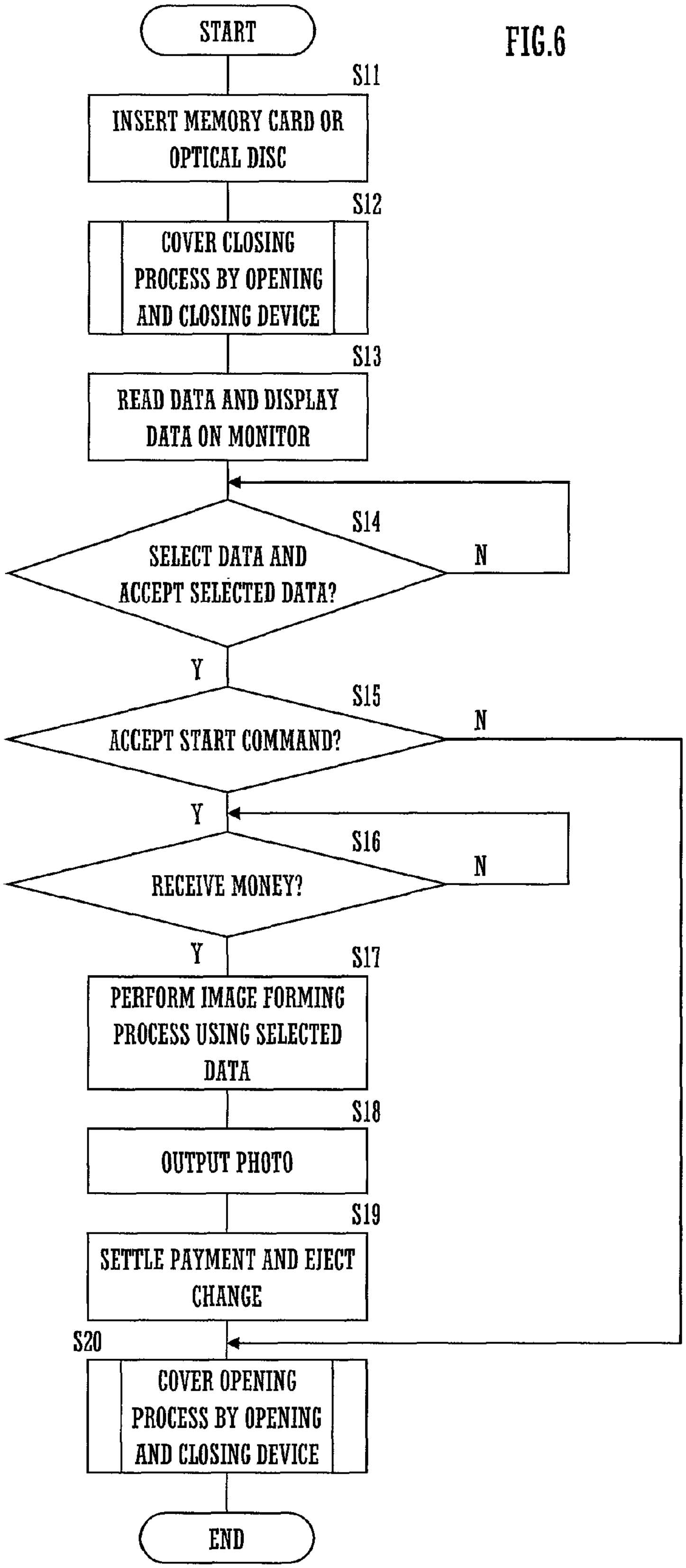
FIG. 6 is a flow chart showing process steps at a time of an image forming process in the image forming apparatus.
Figure 7:
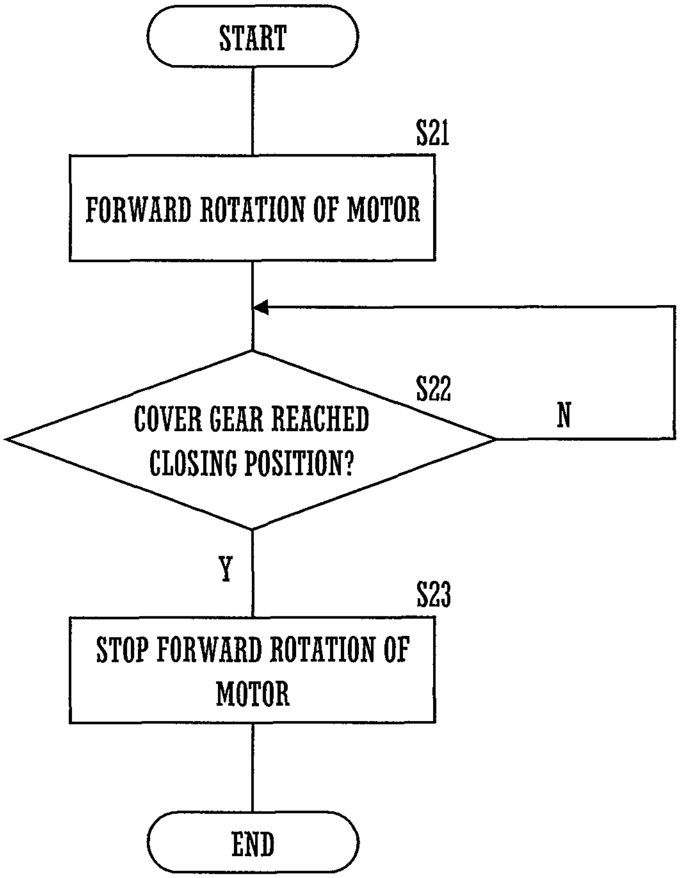
FIG. 7 is a flow chart showing a closing process of the cover in the image forming apparatus.

As shown in FIG. 6, the control portion 105, when sensing that a memory card or an optical disc is inserted into the insertion opening 131A or 132A (S11), performs a closing process of the cover 20 as shown in FIG. 7 (S12). The control portion 105 reads data from the memory card or the optical disc by the reading portion 101, temporarily stores the data in the storage portion 102, and displays the temporarily stored data on the monitor 110 (S13). The control portion 105 waits until selection of the data to be printed is accepted (S14). The control portion 105, when the data to be printed is selected, waits until a print start command is accepted (S15).

The control portion 105, when accepting no print start command, performs an opening process of the cover 20 (S20) and, when accepting the print start command, displays printing charge on the monitor and waits until money is received by the coin receiving port 121 or the bill receiving port 122 (S16).

The control portion 105, when money is received, performs the image formation process by the image forming portion 104 to the sheet for a photographic image, held by the holding portion 103 by using the selected data to be printed (S17), and outputs a photograph after the image formation process to the output port 124 (S18). The control portion 105 settles the payment based on the received amount of money and the printing charge, and ejects a change to the money ejection port 123 (S19), and performs the opening process of the cover 20 (S20).

Subsequently, a description will be made of the closing process of the cover 20. As shown in FIG. 7, the control portion 105, in a state (see FIG. 4A) in which the cover 20 is open, rotates the motor 34 in the forward direction (S21).

The forward rotation of the motor 34 is supplied to the circular arc shaped gear 311 of the cover gear 31 through the gear 32. The cover gear 31 rotates in the closing direction from the open position to the closed position when the forward rotation of the motor 34 is supplied to the cover gear 31. The support element 21 is biased in the closing direction by the twisted coil spring 33 biased in a contracting direction. As a result, the cover 20, as the cover gear 31 rotates in the closing direction, rotates in the closing direction in a state in which the support element 21 contacts the body portion 314A of the restricting rib 314 of the cover gear 31 by the twisted coil spring 33.

The control portion 105 waits until the sensor 36 senses that the cover gear 31 rotates in the closing direction by a predetermined angle and the protruding portion 314B of the restricting portion 314 reaches the closed position through a state (refer to FIG. 4B) in which the cover gear 31 has reached the relaying position and the cover 20 is closed (S22).

While the protruding portion 314B moves from the relaying position to the closed position, the cover 20 cannot rotate in the closing direction and only the cover gear 31 rotates in the closing direction. As a result, the support element 21 of the cover 20 is displaced from a state in which the one end of the support element 21 contacts the body portion 313A to a state in which the other end of the support element 21 contacts the body portion 314A. The twisted coil spring 33 is biased in the contracting direction by a force greater than the biasing force in the state in which the cover 20 is open.

The control portion 105, sensing that the protruding portion 314B has reached the closed position (see FIG. 4C), stops the forward rotation of the motor 34 (S23).

Figure 4B:
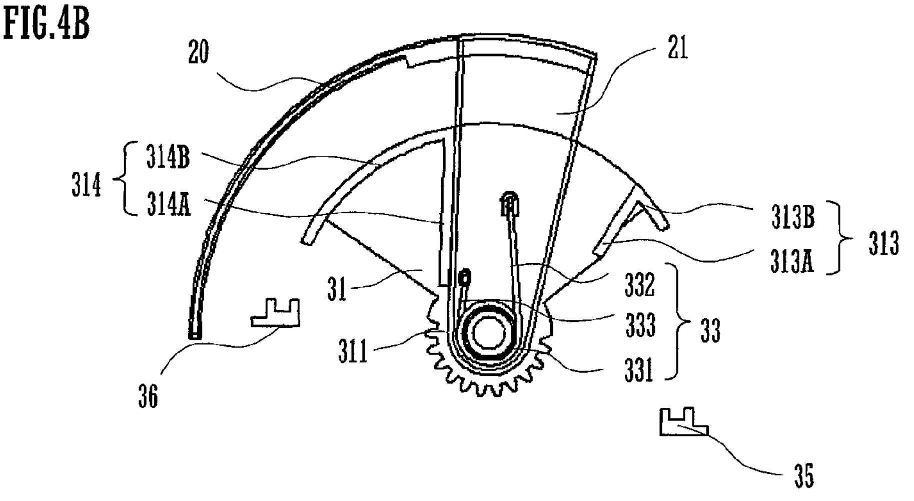
FIG. 4B is a side view in a state in which the cover is closed.
Figure 4C:
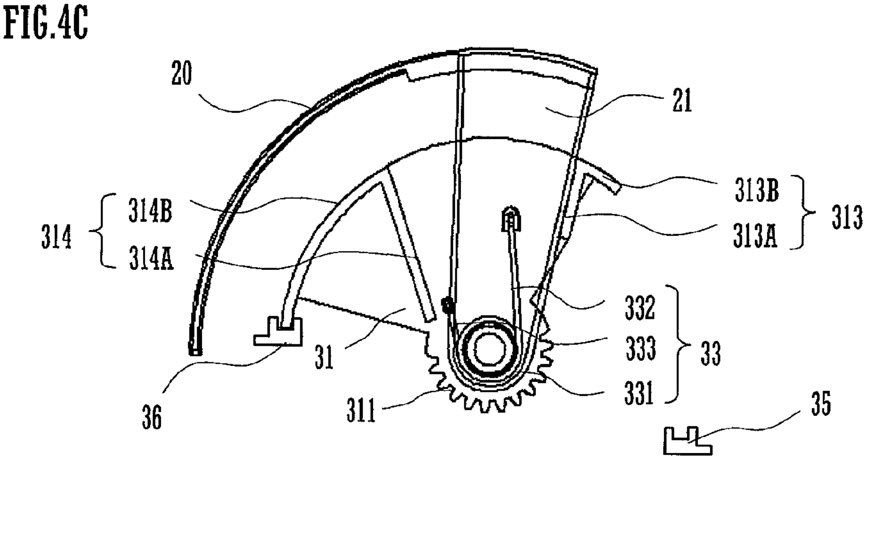
FIG. 4C is a side view in a state in which the cover gear is rotated only by a predetermined angle from the state in which the cover is closed.

When the motor 34 stops the forward rotation, the cover gear 31 rotates in the opening direction from the closed position to the open position by the twisted coil spring 33 biased in the contracting direction since a force rotating in the closing direction is not applied to the cover gear 31, and is displaced to the relaying position in a state in which the cover gear 31 contacts the support element 21 of the cover 20 (see FIG. 4B). The cover 20 is fixed so as not to be rotated by the twisted coil spring 33 and the body portion 313A of the restricting rib 313.

As described above, even if a stop position in which the motor 34 stops the forward rotation deviates, the opening and closing device 30 absorbs the forward rotation of the motor 34 by the cover gear 31 and the twisted coil spring 33, so that no load is applied to the motor 34 and the gear 32. The opening and closing device 30 rotates the cover gear 31 in the closing direction through the forward rotation of the motor 34 in order to securely close the cover 20 even when the motor 34 is rotated in the forward direction after the cover 20 has closed, thus no abnormal noise is generated from the motor 34. The opening and closing device 30 can rotate, by a predetermined angle, only the cover gear 31 in the closing direction in accordance with the forward rotation of the motor 34, thus, if a finger is caught while the cover 20 is being closed from a state in which the cover 20 is open (see FIG. 4A), the finger can easily be pulled out of the cover 20.

Figure 8:
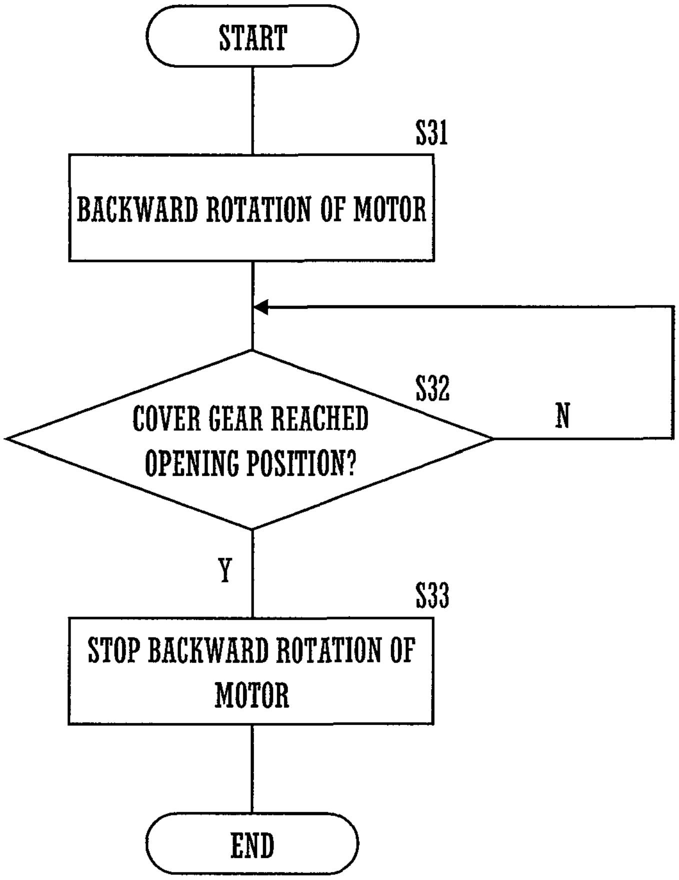
FIG. 8 is a flow chart showing an opening process of the cover in the image forming apparatus.

Subsequently, a description will be made of the opening process of the cover 20. As shown in FIG. 8, the control portion 105, in a state in which the cover 20 is closed (see FIG. 4B), rotates the motor 34 in the backward direction (S31).

The backward rotation of the motor 34 is supplied to the circular arc shaped gear 311 of the cover gear 31 through the gear 32. The cover gear 31 rotates in the opening direction from the relaying position (see FIG. 4B) to the open position when the backward rotation of the motor 34 is supplied to the cover gear 31. The cover 20 is biased in the closing direction by the twisted coil spring 33 biased in the contracting direction. As a result, the cover 20, as the cover gear 31 rotates in the opening direction, rotates in the opening direction in a state in which the support element 21 contacts the body portion 314A of the restricting rib 314 of the cover gear 31 by the twisted coil spring 33.

The control portion 105 waits until the sensor 35 senses that the protruding portion 313B of the restricting rib 313 reaches the open position (S32). The control portion 105 stops the backward rotation of the motor 34 when sensing that the protruding portion 313B has reached the open position (S33).

When the motor 34 stops the backward rotation, a force for rotating in the opening direction is not applied to the cover gear 31. The cover 20 is fixed so as not to be rotated by the twisted coil spring 33 and the body portion 314A of the restricting rib 314.

Figure 9A:
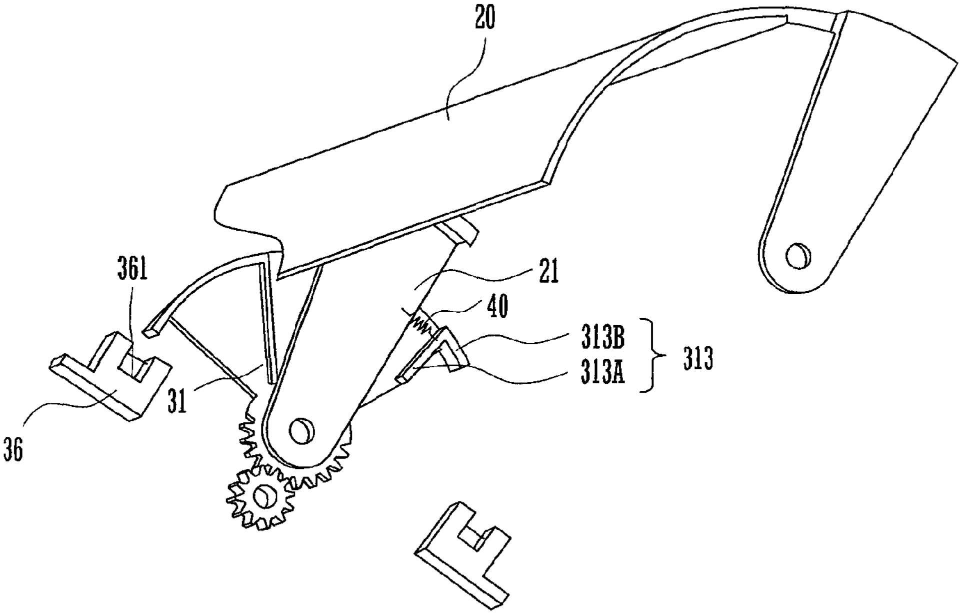
FIGS. 9A and 9B are perspective views showing other examples of the mechanism of the opening and closing device.
Figure 9B:
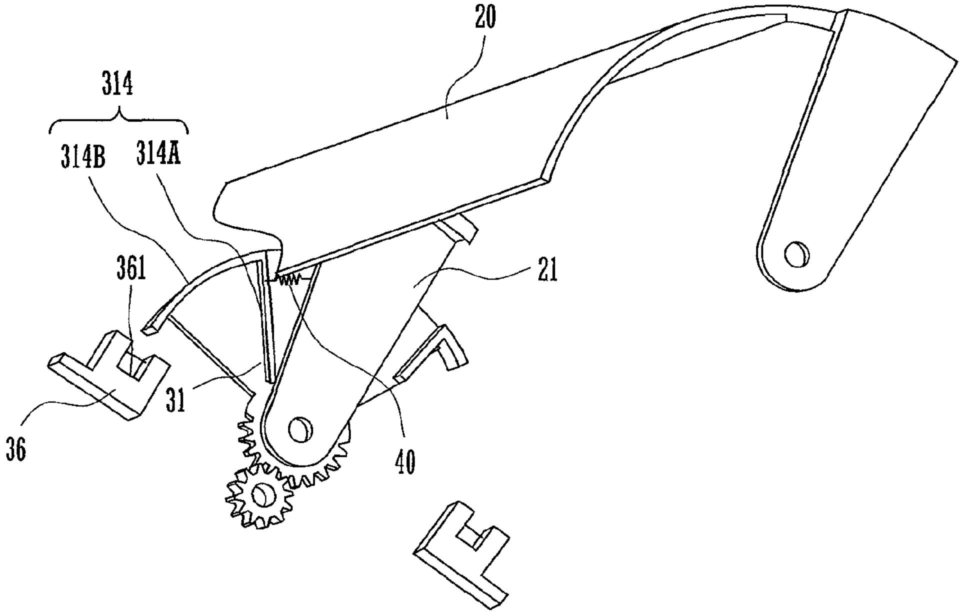

It is to be noted that, in place for the twisted coil spring 33, as shown in FIG. 9A, a spring (which is equivalent to the biasing element of the present invention) 40 may be contracted and provided between the support element 21 of the cover 20 and the body portion 313A of the restricting rib 313. In addition, as shown in FIG. 9B, a spring (which is equivalent to the biasing element of the present invention) 41 may be stretched and provided between the support element 21 of the cover 20 and the body portion 314A of the restricting rib 314.

The above described embodiments are to be considered in all respects as illustrative and not restrictive. The scope of the present invention is defined not by above described embodiments but by the claims. Further, the scope of the present invention is intended to include all modifications that come within the meaning and scope of the claims and any equivalents thereof.

What is claimed is:

1. An opening and closing device comprising:

a cover gear that is rotatably supported in both a forward direction and a backward direction;

a driving source that selectively provides rotation to the cover gear in both the forward direction and the backward direction;

a cover that is rotatably supported to allow motion in both the forward direction and the backward direction between a first position and a second position;

a biasing element that transmits rotation of the cover gear to the cover while biasing the cover in a predetermined direction from the first position to the second position; and a control portion that controls the rotation of the driving source, the control portion being configured to stop the rotation of the driving source, in a case in which the driving source is rotated so as to move the cover in the predetermined direction, when the cover gear rotates in the predetermined direction by a predetermined angle after the cover has reached the second position, wherein the cover gear comprises a pair of restricting portions to restrict the rotation of the cover, the pair of restricting portions comprising of both a first restricting portion positioned in a front side in the predetermined direction and a second restricting portion in a back side in the predetermined direction, both the first restricting portion and the second restricting portion spacing a predetermined gap, the cover rotates in the predetermined gap of the pair of restricting portions, the cover rotates along with the rotation of the cover gear with contacting the first restricting portion by the biasing element while rotating to the second position from the first position, the cover is displaced from a state in which the cover has contacted the first restricting portion to a state in which the cover contacts the second restricting portion before the driving source stops rotating after the cover has reached the second position, and the cover is rotationally-restricted by both the second restricting portion and the biasing element when the driving source stops rotating.

2. The opening and closing device according to claim 1, wherein the cover gear and the cover are supported coaxially.

3. The opening and closing device according to claim 1, further comprising a sensing portion that senses the cover gear in a position when the cover gear has rotated in the predetermined direction by the predetermined angle, wherein the control portion stops the rotation of the driving source when the sensing portion senses the cover gear.

4. The opening and closing device according to claim 1, wherein:

the pair of restricting portions determine a rotation range of the cover by contact of the cover gear with the cover; and the cover contacts the second restricting portion on a side of the second position out of the pair of restricting portions as a result of a biasing force of the biasing element at a time when the rotation of the driving source stops.

5. The opening and closing device according to claim 1, wherein the second position is a closed position in which the cover is closed.

6. An electronic apparatus comprising:

an insertion opening into which a recording medium is attachably and detachably inserted; and the opening and closing device according to claim 1, wherein the insertion opening is covered with the cover.

7. An image forming apparatus comprising:

an insertion opening into which a recording medium is attachably and detachably inserted;

the opening and closing device according to claim 1, wherein the insertion opening is covered with the cover; and an image forming portion that performs an image forming process onto a recording element by using data that is stored in the recording medium that is attached to the insertion opening.

* * * * *